United States Patent
Brunner et al.

(10) Patent No.: US 9,451,155 B2
(45) Date of Patent: Sep. 20, 2016

(54) DEPTH-SEGMENTING PEAK TRACKING AUTOFOCUS

(71) Applicant: Apple Inc., Cupertino, CA (US)

(72) Inventors: Ralph Brunner, Cupertino, CA (US); Michael Chin, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/447,427

(22) Filed: Jul. 30, 2014

(65) Prior Publication Data

US 2016/0037052 A1 Feb. 4, 2016

(51) Int. Cl.
H04N 5/232 (2006.01)
G03B 13/36 (2006.01)
G02B 7/38 (2006.01)

(52) U.S. Cl.
CPC ............ *H04N 5/23212* (2013.01); *G02B 7/38* (2013.01); *G03B 13/36* (2013.01); *H04N 5/23222* (2013.01)

(58) Field of Classification Search
None
See application file for complete search history.

(56) References Cited

U.S. PATENT DOCUMENTS

| | | | |
|---|---|---|---|
| 7,667,175 B2 | 2/2010 | Yamamoto | |
| 8,472,798 B2 | 6/2013 | Molin | |
| 8,570,426 B2 | 10/2013 | Pitts | |
| 2008/0316352 A1* | 12/2008 | Cheng et al. | 348/345 |
| 2010/0157086 A1 | 6/2010 | Segale | |
| 2010/0225800 A1* | 9/2010 | Lee | 348/347 |
| 2012/0106937 A1* | 5/2012 | Molin et al. | 396/121 |
| 2012/0218408 A1* | 8/2012 | Wang et al. | 348/143 |

* cited by examiner

*Primary Examiner* — Mark Monk
(74) *Attorney, Agent, or Firm* — Blank Rome LLP

(57) ABSTRACT

An apparatus, method, and computer readable medium related to autofocusing a camera lens system. An initial image is captured at a first lens position and focus information is extracted with respect to a first plurality of focus windows. A second image is captured at a second lens position and focus information is extracted for a second plurality of focus windows that correspond to the first plurality of focus windows in the initial image. The focus information for corresponding windows is compared to determine whether the focus status in each window is improving or degrading; this determination reveals whether the lens is positioned in a desirable position with respect to the data revealed by the data extracted from the focus windows.

20 Claims, 15 Drawing Sheets

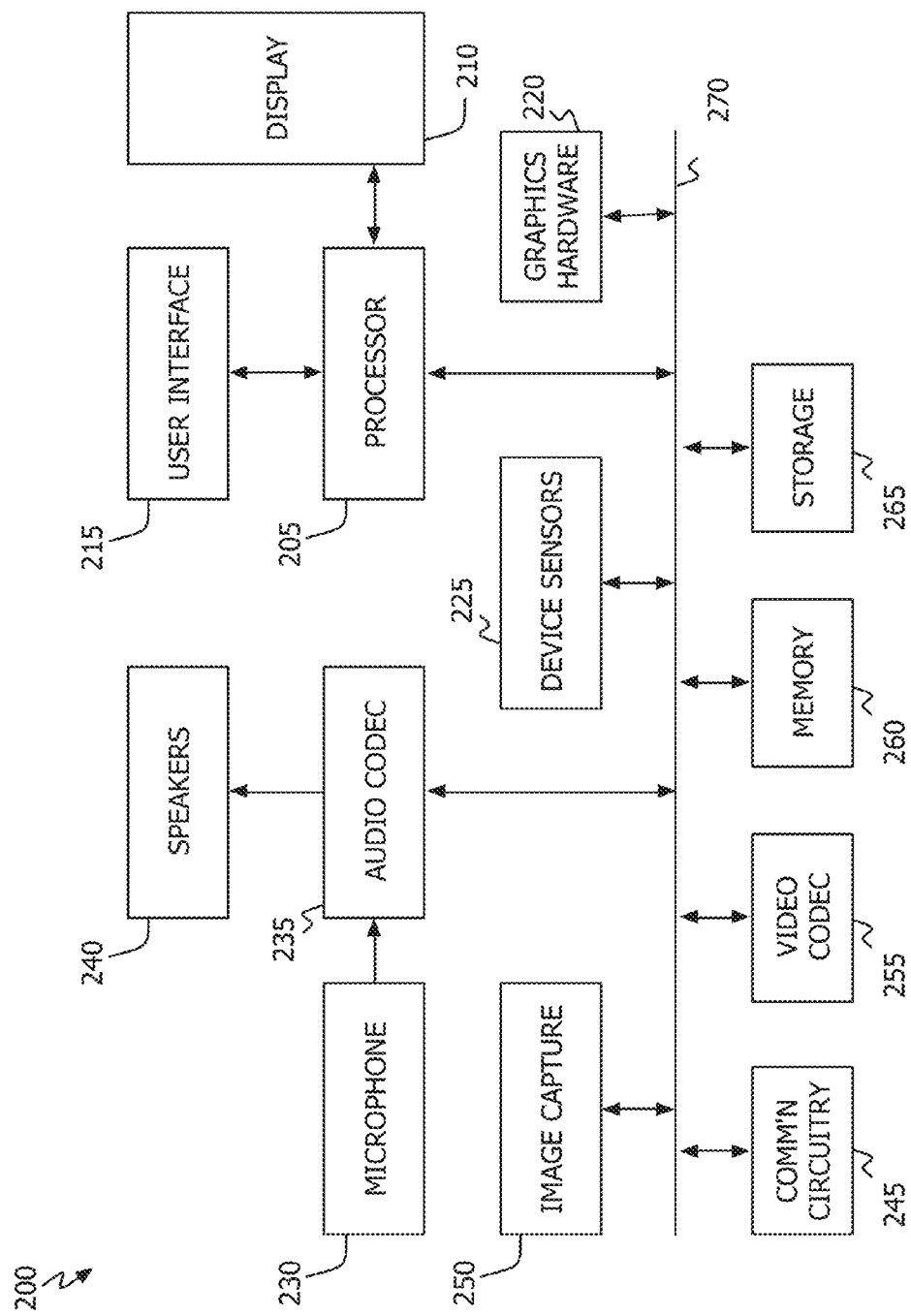

| Window | Value at EP-1 (time 100) | Value at EP-2 (time 500) | Value at EP-3 (time 1250) |
|---|---|---|---|
| FG-1 | 6.9 | 4.3 | 2.5 |
| FG-2 | 5.6 | 5.9 | 2 |
| FG-3 | 8.4 | 5 | 2.5 |
| FG-4 | 1.7 | 2.1 | 3.1 |
| FG-5 | 6.9 | 3.6 | 1.7 |
| FG-6 | 1.2 | 0.2 | 0.1 |
| FG-7 | 9.3 | 7.5 | 2.4 |
| FG-8 | 2.2 | 3.1 | 7.1 |
| FG-9 | 3.7 | 2.9 | 2 |
| FG-10 | 8.2 | 6.5 | 6.2 |
| FG-11 | 4 | 2.5 | 1.6 |
| FG-12 | 4.2 | 6.25 | 8.7 |
| FG-13 | 7.25 | 4.1 | 1.8 |
| FG-14 | 9 | 7.1 | 2.7 |
| FG-15 | 2 | 3.4 | 5.6 |

| 1505 | 1510 | 1515 | 1520 | 1525 | 1530 | 1535 | 1540 | 1545 |
|---|---|---|---|---|---|---|---|---|
| FG-1 | 6.9 | 4.3 | 0 | 9 | 0.2 | 1.8 | 4.3 | 0 |
| FG-2 | 5.6 | 5.9 | 1 | 11 | 0.6 | 6.6 | 12.5 | 12.5 |
| FG-3 | 8.4 | 5 | 0 | 10 | 0.6 | 6 | 5 | 0 |
| FG-4 | 1.7 | 2.1 | 1 | 2 | 0.6 | 1.2 | 3.3 | 3.3 |
| FG-5 | 6.9 | 3.6 | 0 | 7 | 0.2 | 1.4 | 3.6 | 0 |
| FG-6 | 1.2 | 0.2 | 0 | 1 | 0.2 | 0.2 | 0.2 | 0 |
| FG-7 | 9.3 | 7.5 | 0 | 15 | 0.6 | 9 | 7.5 | 0 |
| FG-8 | 2.2 | 3.1 | 1 | 5 | 1 | 5 | 8.1 | 8.1 |
| FG-9 | 3.7 | 2.9 | 0 | 3 | 0.6 | 1.8 | 2.9 | 0 |
| FG-10 | 8.2 | 6.5 | 0 | 13 | 0.2 | 2.6 | 6.5 | 0 |
| FG-11 | 4 | 2.5 | 0 | 3 | 0.2 | 0.6 | 2.5 | 0 |
| FG-12 | 4.2 | 6.25 | 1 | 12 | 0.6 | 7.2 | 13.45 | 13.45 |
| FG-13 | 7.25 | 4.1 | 0 | 8 | 0.6 | 4.8 | 4.1 | 0 |
| FG-14 | 9 | 7.1 | 0 | 14 | 0.6 | 8.4 | 7.1 | 0 |
| FG-15 | 2 | 3.4 | 1 | 6 | 0.2 | 1.2 | 4.6 | 4.6 |
|  |  |  |  |  | total -> | 85.65 | 41.95 |
|  |  |  |  |  | 1/3 total -> | 28.55 |  |

DEPTH-SEGMENTING PEAK TRACKING AUTOFOCUS

BACKGROUND

This disclosure relates generally to the field of digital image capture operations. More particularly, this disclosure relates to techniques for improved autofocus operations in a digital camera. A camera's autofocus system automatically adjusts the camera lens' position to obtain focus on a subject. As used in this disclosure, the term "camera" refers to any device having digital image capture capability. Examples include, but are not limited to, digital SLR cameras, point-and-shoot digital cameras, mobile phones, laptop or notebook computer systems, tablet computer systems, personal digital assistants, and portable music/video players.

Autofocus systems may generally be divided into two types: active, and passive. Active autofocus systems measure the distance to a subject by emitting, and using, a signal to estimate the distance to the subject (e.g., ultrasound and infrared). The estimated distance is then used to adjust or set the camera's focal length (i.e. lens position). In contrast, passive autofocus systems set a camera's focal length or lens position by analyzing an image that enters the camera's optical system. Passive autofocusing can be achieved through phase detection or contrast measurement.

Many small multifunction devices such as mobile phones use a passive autofocus technique based on contrast measurement. In devices such as these, autofocus operations involve adjusting the position of the device's lens to a specified number of locations (e.g. lens arrangements) and evaluating the focus (e.g., contrast) between corresponding areas in successive images. The lens position corresponding to the maximum contrast, as determined by the number of sharp edges detected, is assumed to correspond to maximum sharpness and best focus.

While generally preferred in many situations, passive autofocus systems may suffer from a variety of problems. One example is that in some situations the autofocus system may achieve more clarity in the background of the scene than in the subject. When this happens, the autofocus system sets the focus distance so that the background is in focus while the intended subject is out of focus. The problem of background focusing is illustrated by FIG. 1 in which image 100's autofocus region 105 includes flower (subject) 110 and grass (background) 115. Inspection of image 100 shows background grass 115 is in focus while flower 110 is out of focus. This is because, within autofocus area 105, grass 115 contains many more sharp edges than does flower 110. Because of this, the autofocus system judges the lens position needed to bring the background grass into focus as proper.

SUMMARY

Embodiments of the invention provide a method, system and computer readable medium for determining an autofocus lens position. As used herein, the phrase "autofocus lens position" refers to the lens position determined by a camera's autofocus system as proper. Some embodiments include capturing a first image of a scene using a first lens position and then obtaining a plurality of focus scores or values associated with the image captured at the first lens position. Each of the plurality of focus scores is associated with an area of the image (e.g. a focus window) and indicates the state of focus in that area. In some embodiments, a series of images are captured using a series of respective lens positions varying between the lens' macro position and the lens' infinity position. A plurality of focus windows and focus scores are associated with each image in the series of images, and each focus window has a corresponding focus score (placed similarly or identically with respect to the image frame) for each image. The result is that for each focus window location there are a series of focus scores, each score associated with a different lens position. The data for each focus window may be visualized as in FIG. 7C and characteristically has a single peak representing the lens position where the focus is best in a particular focus window. The comparison of several focus window datum can be visualized as the overlay of respective focus score graphs, each graph having a peak. In some embodiments of the invention, the autofocus system can identify a final lens position by determining the lens position with respect to the placement of the peak values of the focus window data. In some embodiments, the appropriate focus score is determined when one third of the focus window data peaks are on the macro side of the lens position and two thirds of the peaks are on the infinity side of the lens position.

Other embodiments of the invention can achieve the same autofocus resulting lens position using as few as two lens positions. These embodiments recognize that when focus scores for sequential lens positions are increasing (in corresponding focus windows) that the peak lies further toward the macro side of the lens. Similarly, when focus scores for sequential lens positions are decreasing (in corresponding focus windows) that the peak lies toward the infinity side of the lens. By understanding these principles, embodiments of the invention can determine the relative position of focus window peaks by analyzing data at only two lens positions. Therefore, in order to find the one-third macro and two-thirds infinity position discussed above, focus windows from two lens positions may be examined and then, only if necessary, further lens positions may be employed to find either the one-third/two-thirds ratio or any desired positioning based upon focus window data peaks.

In yet other embodiments, for the purpose of evaluating the relative position of peaks, a weighting scheme may be employed. In some embodiments, each time new focus window data is collected based on a new lens position, the relative position of the focus window data peaks with respect to the lens position is analyzed using a weighting system applied to the most recent set of focus window data. For example, in evaluating the location of peaks, focus score data from each window may be weighted according to the position of the window, the magnitude of the focus score for the window, or a combination of both. By weighting the focus score data, the ultimate resulting lens position can bias toward more relevant focus windows and away from less relevant focus windows.

BRIEF DESCRIPTION OF THE DRAWINGS

FIG. 2 shows a representative hardware environment.

FIG. 15 illustrates a table holding focus graph data and weighting data associated with embodiments and examples of embodiments.

DETAILED DESCRIPTION

Figure 1:
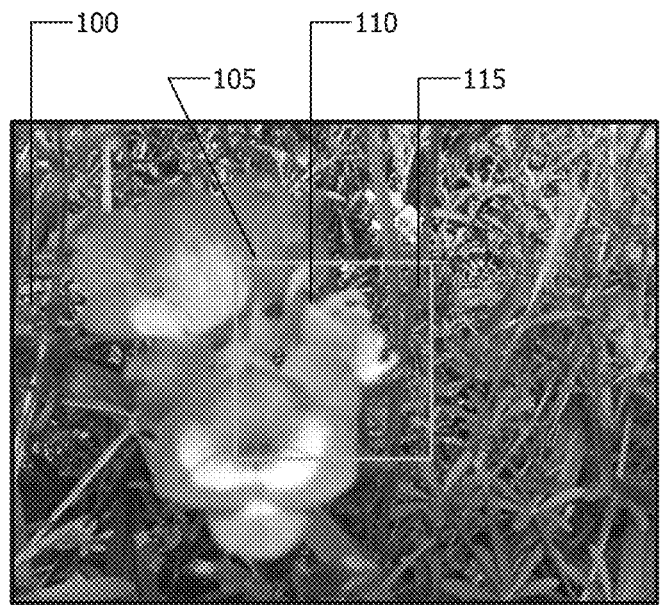
FIG. 1 is an illustrative picture showing a focus area.

This disclosure pertains to systems, methods, and computer readable media to provide improved autofocus operations. In general, techniques are disclosed that show how to improve contrast-based autofocus operations by adjusting the lens arrangement in response to information passively obtained from an observed scene. More particularly, some embodiments disclosed herein evaluate a multi-window autofocus area for each of multiple lens arrangements. In one embodiment, the image data for each lens arrangement may be captured and stored for analysis. Thus, for example, a burst of images may be captured and stored to preserve data regarding a variety of lens arrangements—e.g. one captured image per lens arrangement. For each captured image, focus information may be generated with respect to each window within an autofocus area. When all of the burst-captured images are considered, each window's focus information may be represented by a series of indications (e.g. focus scores), where each indication represents the focus status in a particular window for a particular lens arrangement.

The inventive embodiments described herein may have implication and use in and with respect to all types of devices that may include a digital camera. These devices may include single and multi-processor computing systems and vertical devices (e.g. cameras or appliances) that incorporate single or multi-processing computing systems. The discussion herein references a common computing configuration having a CPU resource including one or more microprocessors. The discussion is only for illustration and is not intended to confine the application of the invention to the disclosed hardware. Other systems having other known or common hardware configurations (now or in the future) are fully contemplated and expected. With that caveat, a typical hardware and software operating environment is discussed below. The hardware configuration may be found, for example, in a smart phone, a server, a laptop, a tablet, a desktop computer, another type of phone, or any computing device, whether mobile or stationary.

Referring to FIG. 2, a simplified functional block diagram of illustrative electronic device 200 is shown according to one embodiment. Electronic device 200 could be, for example, a mobile telephone, personal media device, portable camera, or a tablet, notebook or desktop computer system or even a server. As shown, electronic device 200 may include processor 205, display 210, user interface 215, graphics hardware 220, device sensors 225 (e.g., GPS, proximity sensor, ambient light sensor, accelerometer and/or gyroscope), microphone 230, audio codec(s) 235, speaker(s) 240, communications circuitry 245, image capture circuitry and/or hardware such as optics 250 (e.g. camera), video codec(s) 255, memory 260, storage 265 (e.g. hard drive(s), flash memory, optical memory, etc.) and communications bus 270. Communications circuitry 245 may include one or more chips or chip sets for enabling cell based communications (e.g., LTE, CDMA, GSM, HSDPA, etc.) or other communications (WiFi, Bluetooth, USB, Thunderbolt, Firewire, etc.). Electronic device 200 may be, for example any type of device where photo capture may be useful or desirable.

Processor 205 may execute instructions necessary to carry out or control the operation of many functions performed by electronic device 200 (e.g., such as to run a camera application with user interface, or programs and routines to perform camera functions such as autofocus and image analysis). In general, many of the functions described herein are based upon a microprocessor acting upon software (instructions) embodying the function. Processor 205 may, for instance, drive display 210 and receive user input from user interface 215. User interface 215 can take a variety of forms, such as a button, keypad, dial, a click wheel, keyboard, display screen and/or a touch screen, or even a microphone or camera (video and/or still) to capture and interpret input sound/voice or images including video. The user interface 115 may capture user input for any purpose including for photography scene selection, image framing, automatic and/or assisted focus function and image capture as well as any other camera control feature known now or in the future. In some embodiments, a camera application program will display interfaces for interaction with a user/photographer. In those embodiments, the user may employ a touch interface to interact with the camera application controls, sometimes simultaneously while viewing the camera's reproduction of a live scene or a previously captured image (e.g. the controls are presented over the scene/image and/or around its edges).

Processor 205 may be a system-on-chip such as those found in mobile devices and may include a dedicated graphics processing unit (GPU). Processor 205 may be based on reduced instruction-set computer (RISC) or complex instruction-set computer (CISC) architectures or any other suitable architecture and may include one or more processing cores. Graphics hardware 220 may be special purpose computational hardware for processing graphics and/or assisting processor 205 to process graphics information. In one embodiment, graphics hardware 220 may include one or more programmable graphics processing units (GPU).

Sensors 225 and camera 250 may capture contextual and/or environmental phenomena such as location information, the status of the device with respect to light, gravity and the magnetic north, and even still and video images. All captured contextual and environmental phenomena may be used to contribute to the function, feature and operation of the camera and related software and/or hardware. Output from the sensors 225 or camera 250 may be processed, at least in part, by video codec(s) 255 and/or processor 205 and/or graphics hardware 220, and/or a dedicated image processing unit incorporated within circuitry 250. Information so captured may be stored in memory 260 and/or storage 265 and/or in any storage accessible on an attached network. Memory 260 may include one or more different types of media used by processor 205, graphics hardware 220, and image capture 250 to perform device functions. For example, memory 260 may include memory cache, electrically erasable memory (e.g., flash), read-only memory (ROM), and/or random access memory (RAM). Storage 265 may store data such as media (e.g., audio, image and video files), computer program instructions, or other software including database applications, preference information, device profile information, and any other suitable data. Storage 265 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 260 and storage 265 may be used to retain computer program instructions or code organized into one or more modules in either compiled form or written in any desired computer programming language. When executed by, for example, processor 205, such computer program code may implement one or more of the acts or functions described herein.

Figure 3:
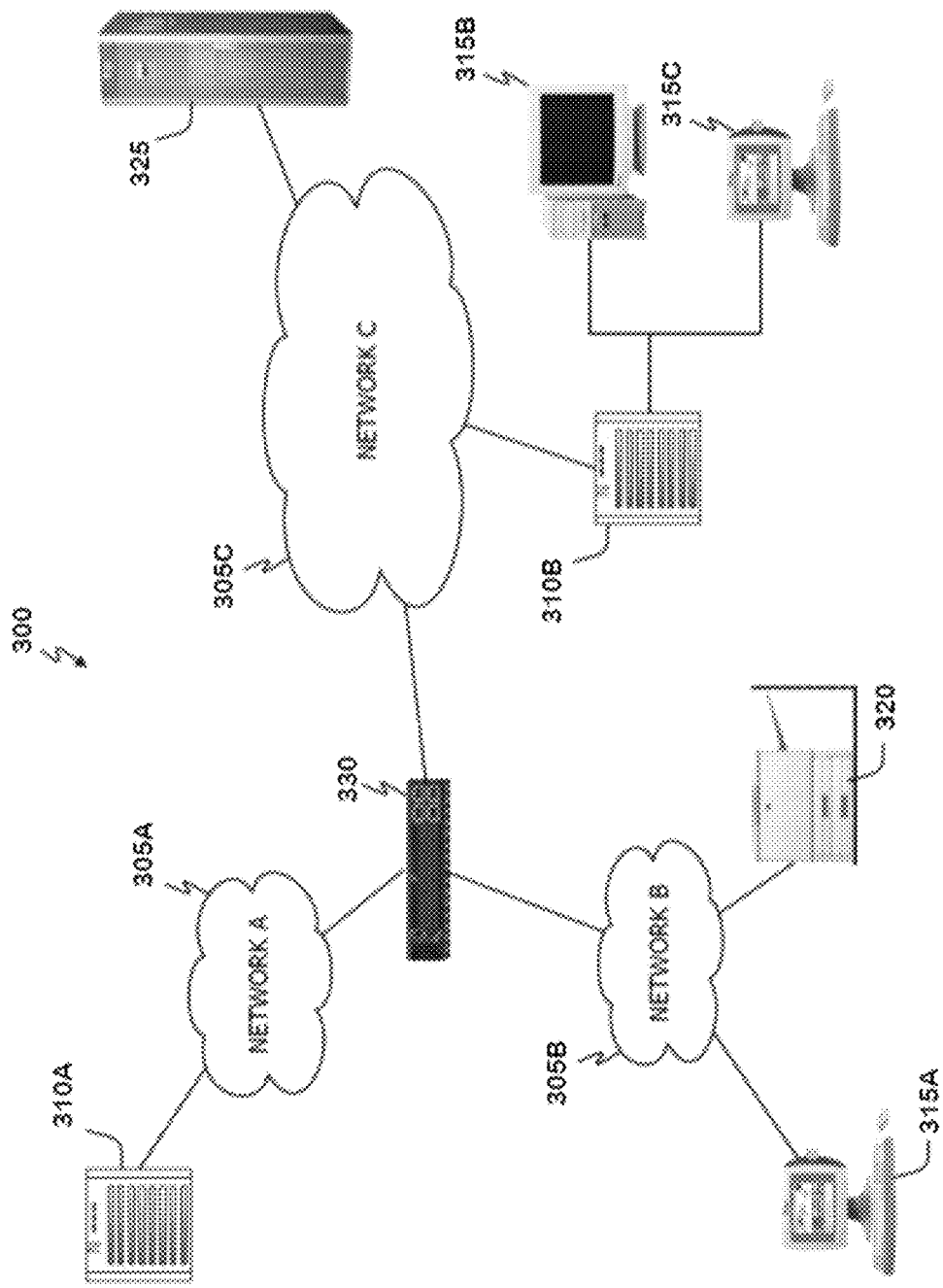
FIG. 3 shows a representative network environment.

Referring now to FIG. 3, illustrative network architecture 300, within which the disclosed techniques may be implemented, includes a plurality of networks 305, (i.e., 305A, 305B and 305C), each of which may take any form including, but not limited to, a local area network (LAN) or a wide area network (WAN) such as the Internet. Further, networks 305 may use any desired technology (wired, wireless, or a combination thereof) and protocol (e.g., transmission control protocol, TCP). Coupled to networks 305 are data server computers 310 (i.e., 310A and 310B) that are capable of operating server applications such as databases and also capable of communicating over networks 305. One embodiment using server computers may involve the operation of one or more central systems to collect, process, and distribute images or controls and/or functionality related to image capture. For example, a camera may be controlled through a remote user interface accessed over a PAN, LAN or WAN. Similarly, capture images, whether in final form or as used for camera functions such as auto focus, may be sent over the network Also coupled to networks 305, and/or data server computers 310, are client computers 315 (i.e., 315A, 315B and 315C), which may take the form of any computer, set top box, entertainment device, communications device, or intelligent machine, including embedded systems. In some embodiments, users will employ client computers in the form of smart phones or tablets. Also, in some embodiments, network architecture 310 may also include network printers such as printer 320 and storage systems such as 325, which may be used to store multi-media items (e.g., images) that are referenced herein. To facilitate communication between different network devices (e.g., data servers 310, end-user computers 315, network printer 320, and storage system 325), at least one gateway or router 330 may be optionally coupled there between. Furthermore, in order to facilitate such communication, each device employing the network may comprise a network adapter. For example, if an Ethernet network is desired for communication, each participating device may have an Ethernet adapter or embedded Ethernet capable ICs. Further, the devices may carry network adapters for any network in which they will participate.

As noted above, embodiments of the inventions disclosed herein include software. As such, a general description of common computing software architecture is provided as expressed in layer diagrams of FIG. 4. Like the hardware examples, the software architecture discussed here is not intended to be exclusive in any way but rather illustrative. This is especially true for layer-type diagrams, which software developers tend to express in somewhat differing ways. In this case, the description begins with layers starting with the O/S kernel, so lower level software and firmware has been omitted from the illustration but not from the intended embodiments. The notation employed here is generally intended to imply that software elements shown in a layer use resources from the layers below and provide services to layers above. However, in practice, all components of a particular software element may not behave entirely in that manner.

Figure 4:
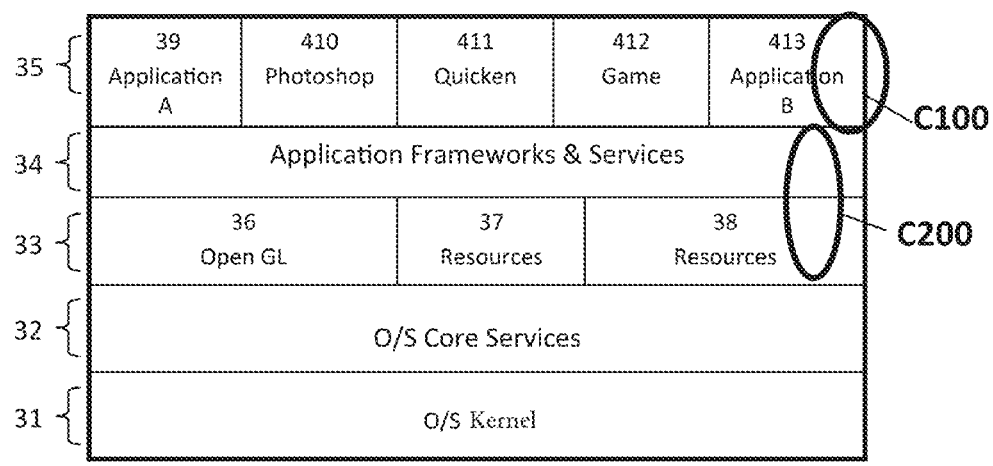
FIG. 4 shows representative software architecture.

With those caveats regarding software, referring to FIG. 4, layer 31 is the O/S kernel, which provides core O/S functions in a protected environment. Above the O/S kernel is layer 32 O/S core services, which extends functional services to the layers above, such as disk and communications access. Layer 33 is inserted to show the general relative positioning of the Open GL library and similar application and framework resources. Layer 34 is an amalgamation of functions typically expressed as multiple layers: applications frameworks and application services. For purposes of our discussion, these layers provide high-level and often functional support for application programs which reside in the highest layer shown here as item 35. Item C100 is intended to show the general relative positioning of the application software, including any camera application software described for some of the embodiments of the current invention. In particular, in some embodiments, a camera software application is used to interact with the user through user interfaces facilitated by the host device. The camera application software allows the user to perform normal camera operations such as framing the image in a scene, choosing effects, zooming, choosing the aspect ratio of the image, indicating when a capture should occur as well as any other functions that may be performed on a stand-alone digital camera. In some embodiments, application layer camera software will rely on frameworks and resources in the layer shown as C200. Furthermore, in some embodiments, the invention may be implemented as a resource and/or framework for use with application programs that use an API or interface provided by the invention. While the ingenuity of any particular software developer might place the functions of the software described at any place in the software stack, the software hereinafter described is generally envisioned as all of: (i) user facing, for example, to allow user operation of camera functionality; (ii) as a utility, or set of functions or utilities, beneath the application layer, providing focus resources to application programs or other programs; and (iii) as one or more server applications for providing the same functions and/or services to client devices over a network. Furthermore, on the server side, certain embodiments described herein may be implemented using a combination of server application level software, database software, with either possibly including frameworks and a variety of resource modules.

No limitation is intended by these hardware and software descriptions and the varying embodiments of the inventions herein may include any manner of computing device such as Macs, PCs, PDAs, phones, servers, or even embedded systems.

In the following description, for purposes of explanation, numerous specific details are set forth in order to provide a thorough understanding of the inventive concepts. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "some embodiments," "one embodiment" or "an embodiment" should not be understood as necessarily all referring to the same embodiment.

Figure 5A:
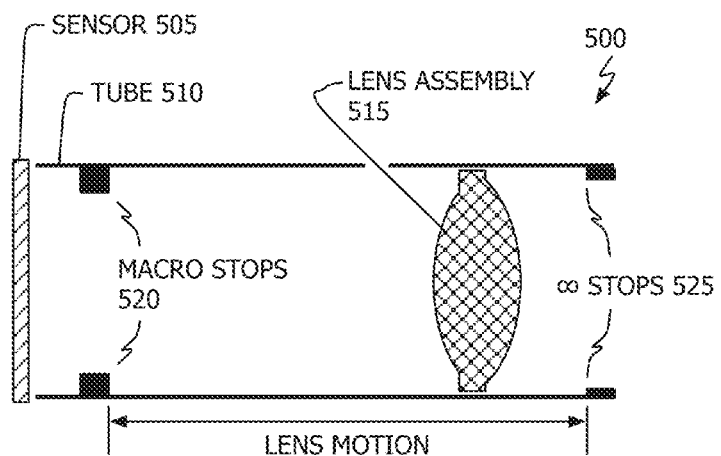
FIG. 5A shows an illustrative lens arrangement.
Figure 5B:
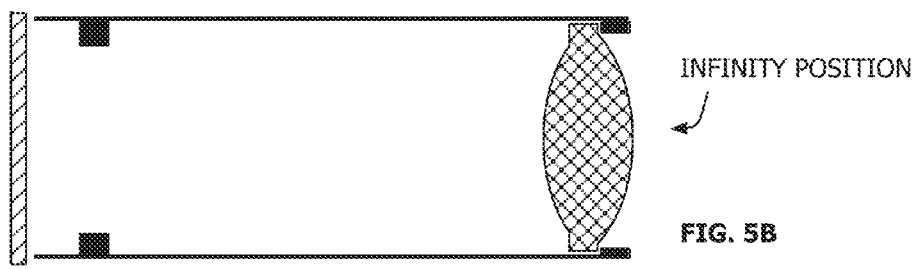
FIG. 5B shows an illustrative lens arrangement.
Figure 5C:
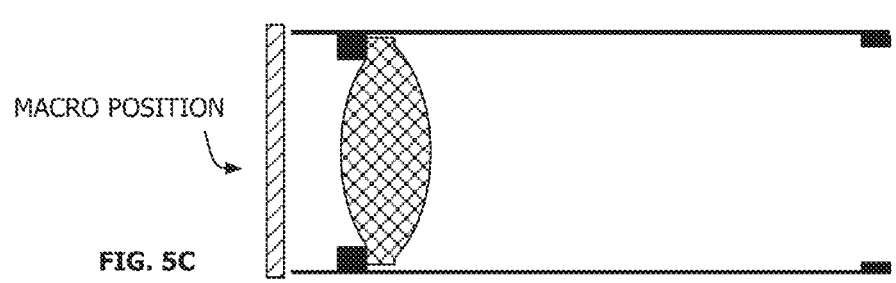
FIG. 5C shows an illustrative lens arrangement.

In order to illuminate discussion of various embodiments, it may be useful to review a typical camera's structure visa vis lens movement. Referring to FIG. 5A, capture assembly 500 can include image sensor 505, lens tube 510, lens assembly 515, macro stops 520, and infinity (∞) stops 525. In this disclosure, the terms "lens" and "lens assembly" are taken to be synonymous, and the term "lens arrangement" is used to refer to a particular relative positioning of a lens assembly 515 with respect to the image sensor 505 and/or the positioning of multiple lenses within a lens assembly with respect to each other. As such, the term lens can mean a single optical element or multiple elements configured into a stack or other arrangement. Referring to FIG. 5B, when lens 515 is against macro stops 520, imaging assembly 500 may focus on objects as close as a first distance (hereinafter referred to as the "macro distance"). Referring to FIG. 5C, when lens 515 is against infinity stops 525, all objects beyond a second distance will be in focus (hereinafter referred to as the "infinity distance"). During autofocus operations, lens 515 may be moved from one end of tube 510 to the other, stopping to capture an image at a specified number of locations along the way. In some embodiments, the movement of the lens 515 is under control of software running on a processor such as the microprocessor discussed above. The locations at which lens 515 stops may be uniformly or non-uniformly distributed between the two sets of stops (macro 520 and infinity 525). One of ordinary skill in the art will recognize that a particular camera's macro and infinity distances, as well as the number of lens positions used during autofocus operations, can depend on the camera's specific design. By way of example, some modern mobile telephones have a macro distance of 10-40 centimeters, an infinity distance of 1.5-3 meters, and can take between 9 and 15 images—each at a different lens position—during autofocus operations. Finally, while many embodiments of the invention employ an optical focusing system as described, the discussion regarding the physical lens positioning and arrangements is not intended to confine the invention to any particular type of focus manipulation. Embodiments of the invention demonstrate how to employ scene information to adjust the focus of a camera, the invention is not confined to any particular type of focusing system. For example, the invention may be implemented with light field focusing systems, which differ from the optics pictured in FIG. 5. In addition, embodiments of the invention include the use of a camera application running on a general purpose computer such as a smartphone or a tablet having an integral camera. In these embodiments, the activation of the camera application by the user may initiate the autofocus process whereby the lens is moved under control of either the camera application or framework/resource software associated with the camera. In some embodiments the camera application uses the framework software, which in turn directly controls the motion of the lens.

Figure 6:
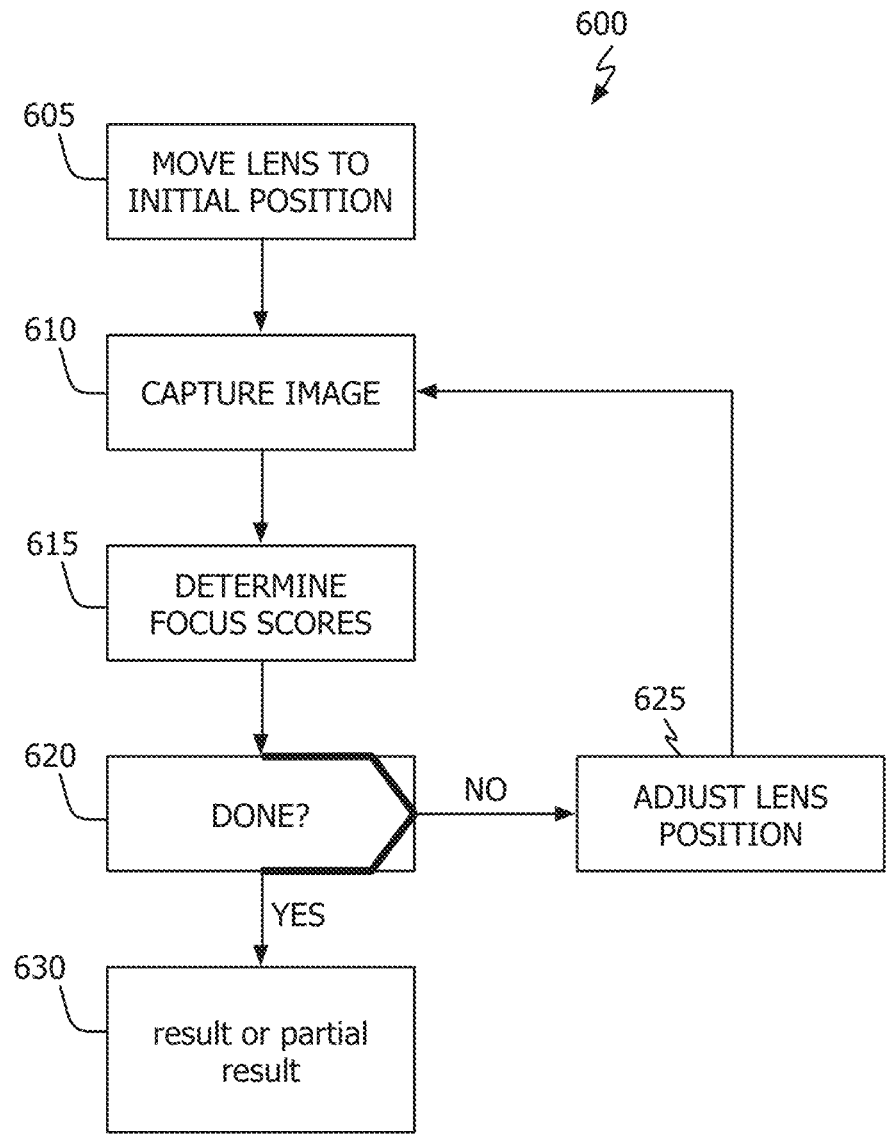
FIG. 6 shows an illustrative process associated with an invention.

Referring to FIG. 6, autofocus operation 600, in accordance with one embodiment, can begin by moving a camera's lens to an initial or start position (block 605). Example start positions include the camera's macro and infinity distance positions (see FIGS. 5B and 5C) or potentially any position in between, such as a center position approximately between the macro and infinity positions. Once positioned, a first image may be captured (block 610), after which focus scores for the image may be determined (block 615). One approach to the generation of focus scores is to use dedicated hardware whose operating parameters may be set via software and/or firmware. Such hardware may be part of, or intimately coupled to, a camera's image processing pipeline hardware. In contrast-based autofocus systems, focus scores may be indicative of the number of hard edges identified in a specified area of an image.

Figure 7C:
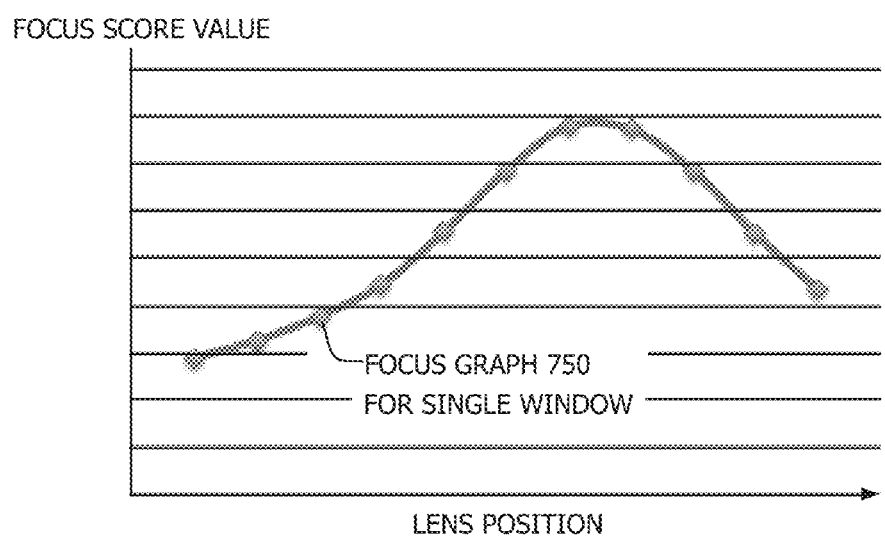
FIG. 7C illustrates a focus graph.
Figure 7A:
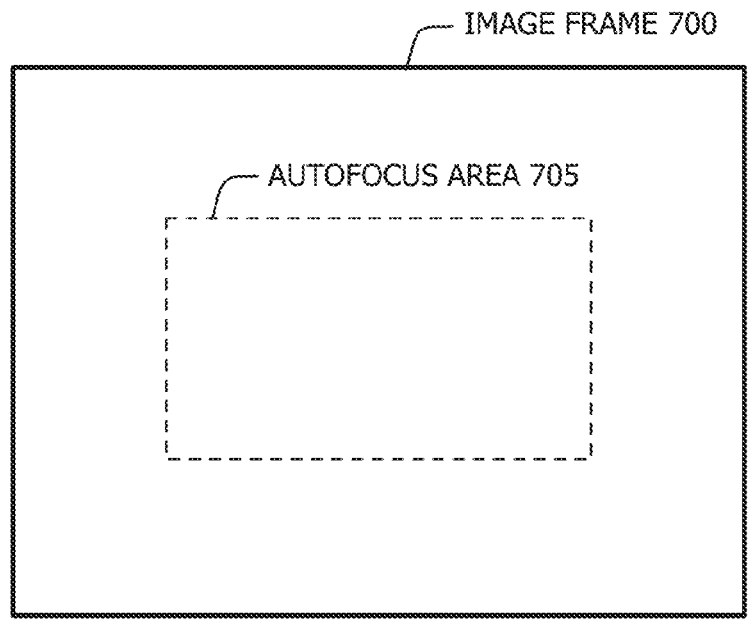
FIG. 7A illustrates an autofocus area in a frame.
Figure 7B:
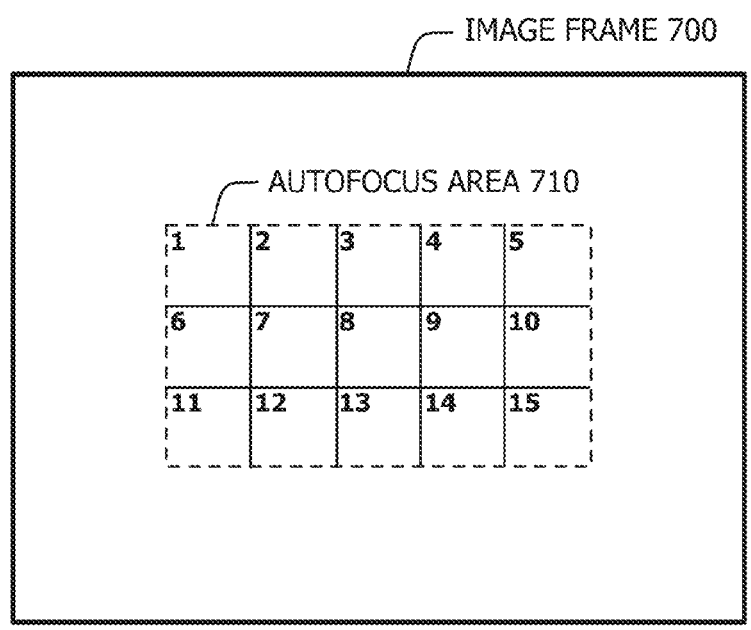
FIG. 7B illustrates an autofocus area divided into 15 windows.

Referring to FIG. 7A and in accordance with autofocus operation 600, capture frame 700 (representing image data captured by sensor 505) has within it autofocus area 705. In general, only image data within autofocus area 705 is considered during autofocus operation 600. In one embodiment, autofocus area 705 may be coincident with capture frame 700. In another embodiment, autofocus area 705 may be centered in frame 700 as shown. In still another embodiment, the location and/or size of autofocus area 705 may be moved and/or divided under user and/or program control. For example, a user may select one or more focus areas by touching the screen or using a displaying interface to move and position one or more focus points on the screen of a device. As another example, program control may evaluate the contents of an image and place focus points accordingly with respect to the subject (e.g., if subject is aligned against one side of the frame and the rest of the frame is a smooth, uniformly colored, surface). In general, embodiments in accordance with autofocus operation 600 partition autofocus area 705 into multiple smaller regions (hereinafter referred to as windows). For example, autofocus area 705 may be partitioned into a W×H grid of windows. Referring to FIG. 7B, autofocus area 710 is shown partitioned into a (5×3) grid of windows. The number of windows into which autofocus area 705 may be partitioned may be dependent, at least in part, on the specialized focus metric components used and/or the amount of available memory.

Returning to FIG. 6, after an image is captured (block 610) and its focus scores obtained (block 615), a test may be made to determine if all of the desired or needed images have been acquired (block 620). One illustrative autofocus system may be designed (or programmed) to capture one image at each of nine (9) lens positions while another may be designed (or programmed) to capture one image at each of thirteen (13) lens positions. In some embodiments (discussed in further detail later), the focus analysis may be performed with as few as two (2) lens positions (i.e. images) so the number of images captured will be the minimum number necessary to make a final focus determination. In any of the foregoing situations, if at least one image remains to be captured (the "NO" prong of block 620), the position of lens 515 may be adjusted (block 625), whereafter autofocus operation 600 continues at block 610. In some embodiments, actions in accordance with blocks 605-625 may be known or referred to as the "scan phase" on autofocus operation 600. If all needed images have been captured (the "YES" prong of block 620), a result or partial result may be obtained at block 330 including: the best focus score for each window and their corresponding lens positions, or a determination regarding the best lens position may be made.

If M represents the number of images captured, and N represents the number of windows in the autofocus area (e.g., autofocus area 405), actions in accordance with blocks 610-625 generate (M×N) focus scores; M focus scores for each of the N windows in the autofocus area. If each of the M focus scores for a single window are plotted against the lens position at which each was determined, the resulting plot is referred to as a focus graph. See FIG. 7C. In one embodiment, the peak of the focus graph indicates the best focus distance for that window (e.g., focus graph 750). When each of the N groups of M focus scores is evaluated in this way, each window's best focus score—and its corresponding lens position—may be determined as a result or partial result (block 630).

The lens positions corresponding to the collection of N focus scores determined in accordance with block 630 can be reviewed and, using one or more selection criteria, the best autofocus lens position for the camera may be chosen. In one embodiment, the collection of lens positions may be sorted or arranged to facilitate the identification of lens positions at a specified percentile (or equivalent measure) from either the camera's macro position or infinity position. For example, if the selection criterion is the "33rd percentile from the macro position," the autofocus lens position may be set to a distance corresponding to that lens position that is ⅓ the way between the macro distance and the infinity distance in the list of lens positions corresponding to the N focus scores. The same setting would result if the selection criteria were 67th percentile from the infinity position."

Figure 8:
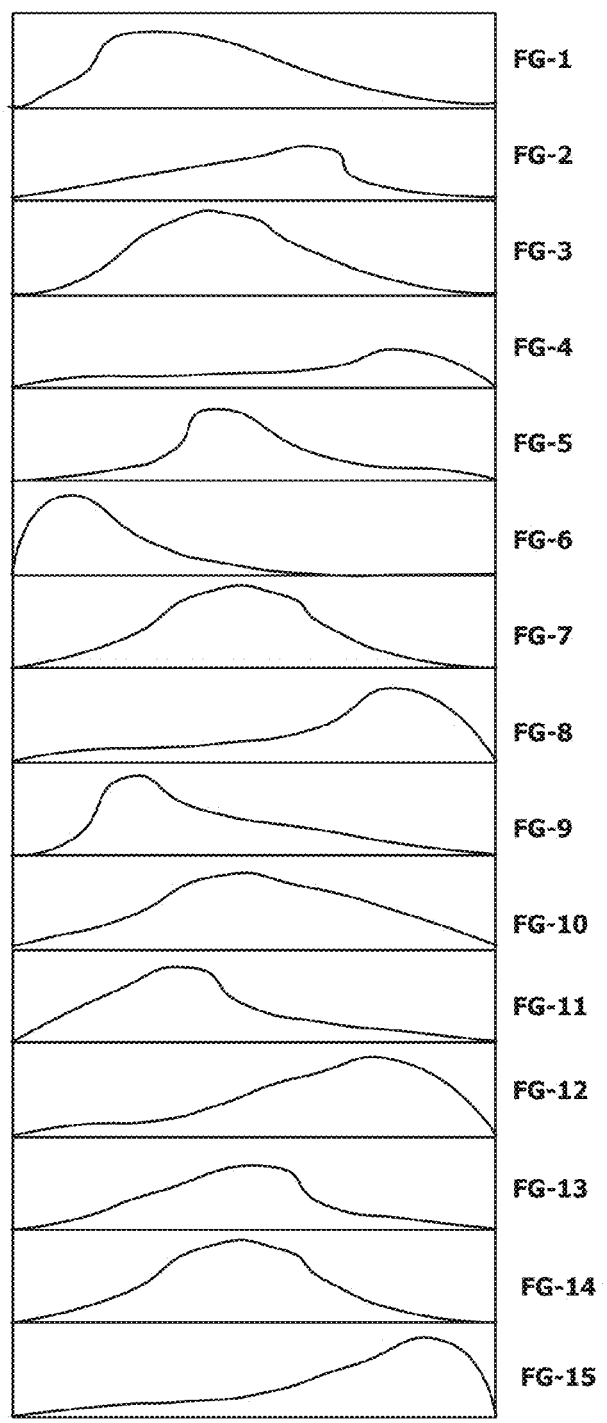
FIG. 8 shows an illustrative collection of 15 focus graphs aligned so that a vertical line through all the graphs represents a single lens position.

By way of illustration FIG. 8 shows 15 focus graphs aligned so that a vertical line will intersect every graph at a point corresponding to the same lens position (e.g. the left side is the infinity position while the right side is the macro position).

Figure 9:
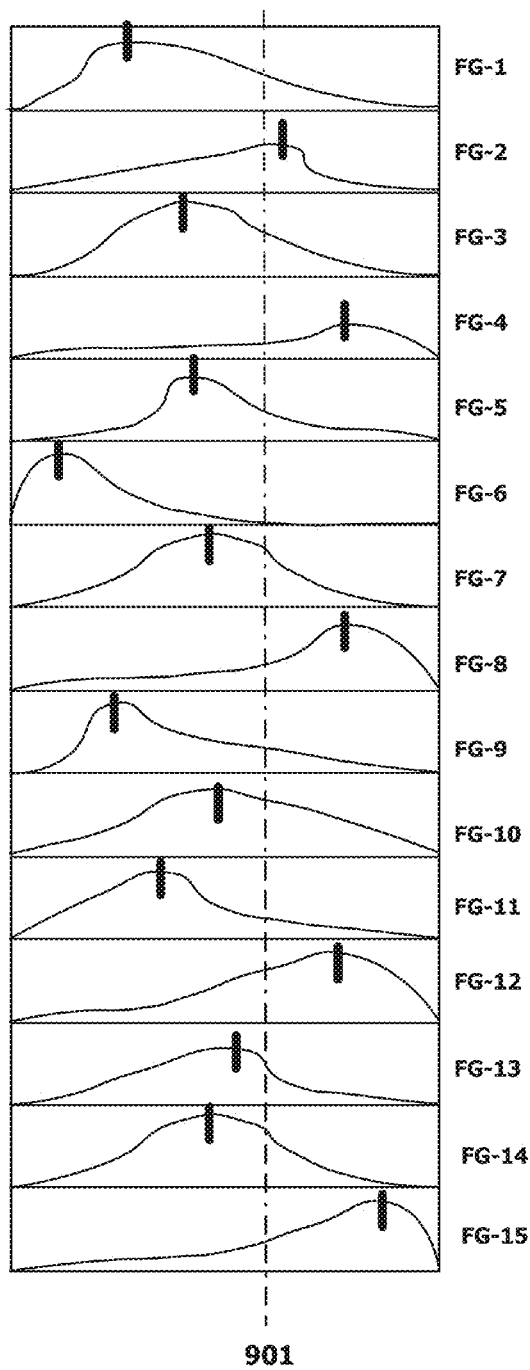
FIG. 9 shows the illustrative collection of 15 focus graphs aligned so that a vertical line through all the graphs represents a single lens position.

As shown in FIG. 9, each focus graph has a peak which represents the position of the lens where the focus for that particular window is best. The peaks are indicated with black bars. Since each of the peaks represents the best lens position for a particular window, the relationship between the peaks can indicate a best overall lens position for focusing on the intended subject in the frame. For example, in one embodiment the center peak (i.e. the peak of FG-14) may be chosen as the approximate or preferred lens position. In other embodiments, the best lens position may be indicated by a ratio of peak values/locations. For example, as indicated above, for some embodiments the inventors have empirically determined that a ⅓ macro-⅔ infinity position is preferred. Referring to FIG. 9, the dashed line 901 illustrates the ⅓ macro–⅔ infinity position because 5 peaks reside on the macro side of the line (⅓ of 15) while 10 peaks reside on the infinity side (⅔ of 15).

Referring again to FIG. 9, since focus graphs carrying useful information generally have only one peak, we anticipate the location of a peak by observing whether the value of a focus graph is increasing or decreasing at any particular point. For example, where dashed line 901 crosses FG-1, the value of FG-1 is decreasing, meaning that the peak of FG-1 is behind the dashed line 901. To generalize this observation, in some embodiments, it is assumed that a peak will be found in the direction of increasing focus score values and not in the direction of decreasing focus score values. Therefore, if we track the focus graphs horizontally through dashed line 901, the five focus graphs peaking to the right of line 901 are all increasing as the pass through line 901.

Figure 10:
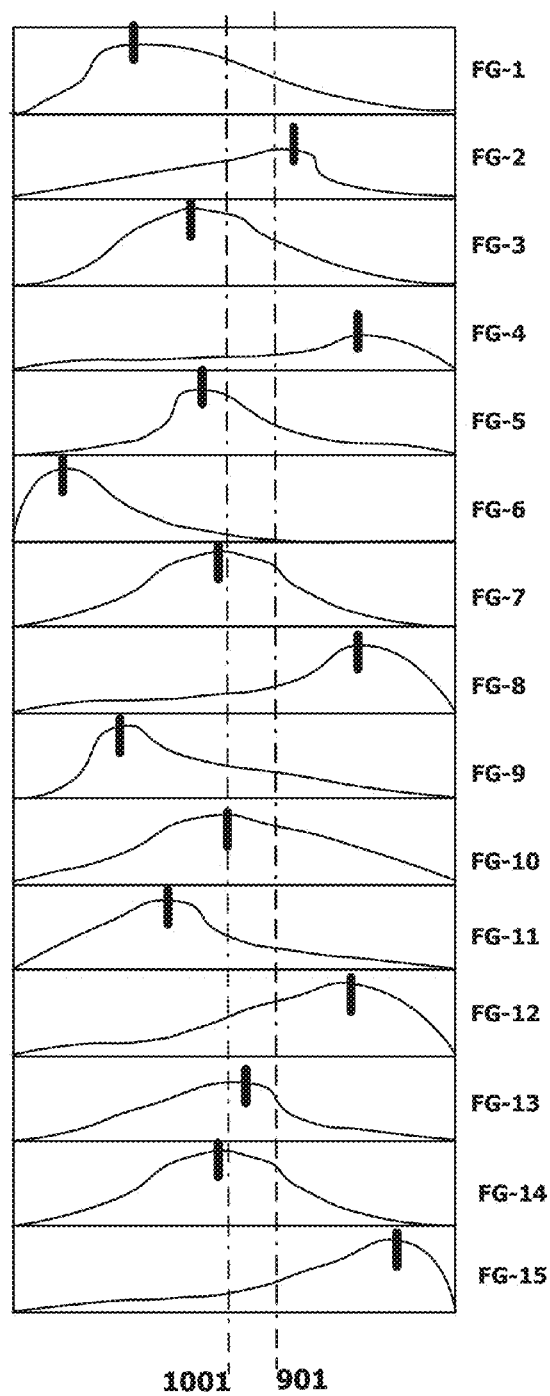
FIG. 10 shows the illustrative collection of 15 focus graphs aligned so that a vertical line through all the graphs represents a single lens position.

Referring to FIG. 10, we can observe that the ⅓ macro-⅔ infinity lens position can be found with data from as little as two lens positions. By evaluating whether the focus data is rising or falling between lens position 1001 and lens position 901, we can infer the location of the peak for each focus graph (i.e. peaks are found in the direction of rising values). Therefore, having data from only two lens positions, the relative placement of the lens with respect to the data peaks may be assessed. Furthermore, if a change in relative placement is desired, new lens positions are only needed until the desired relative positioning is found. By using fewer lens positions, the auto focusing process may be hastened (because fewer lens adjustments are required) and fewer image captures and mathematical calculations are necessary.

Figure 11:
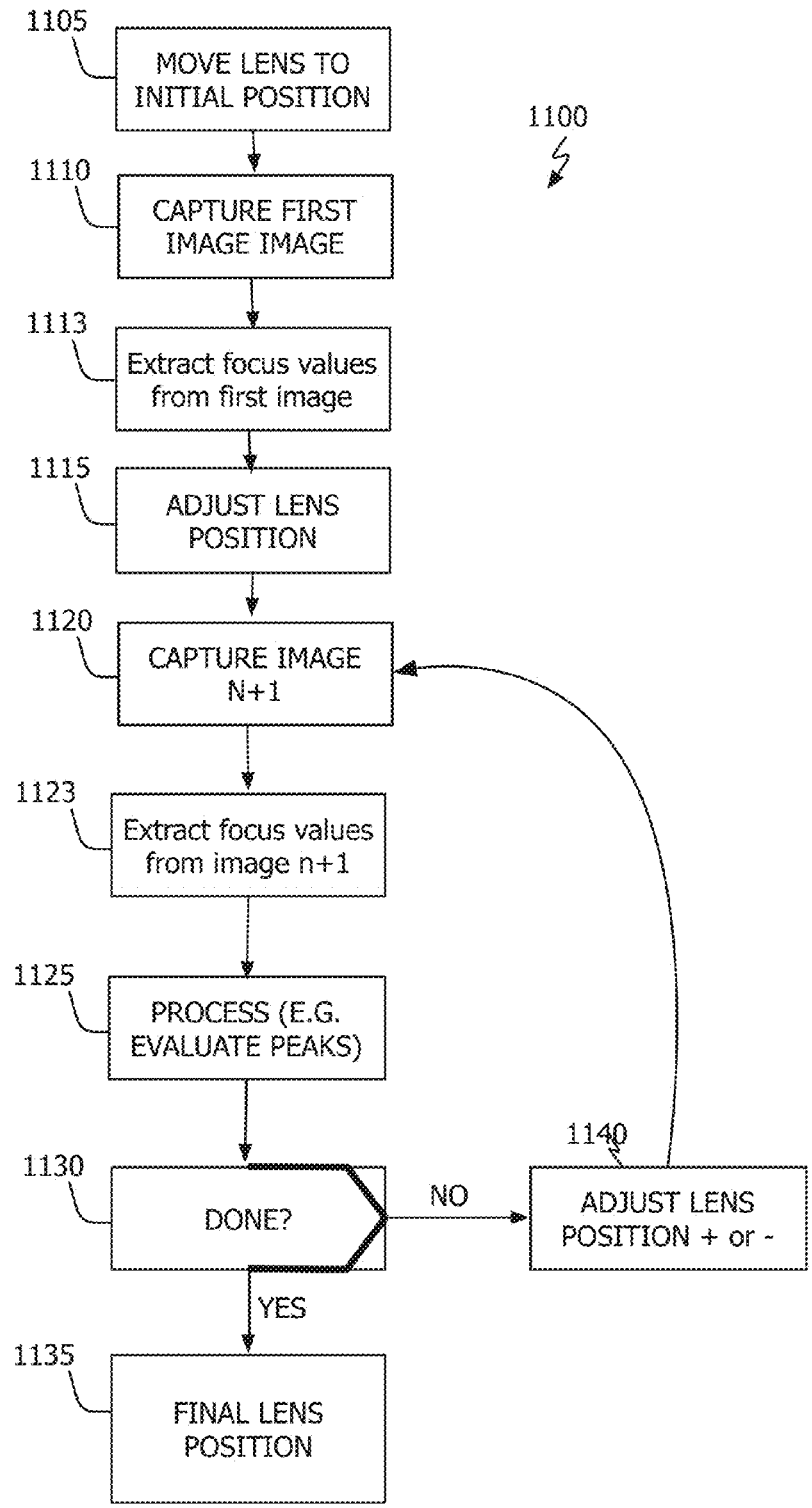
FIG. 11 diagrams a process associated with embodiments of the invention.
Figure 12:
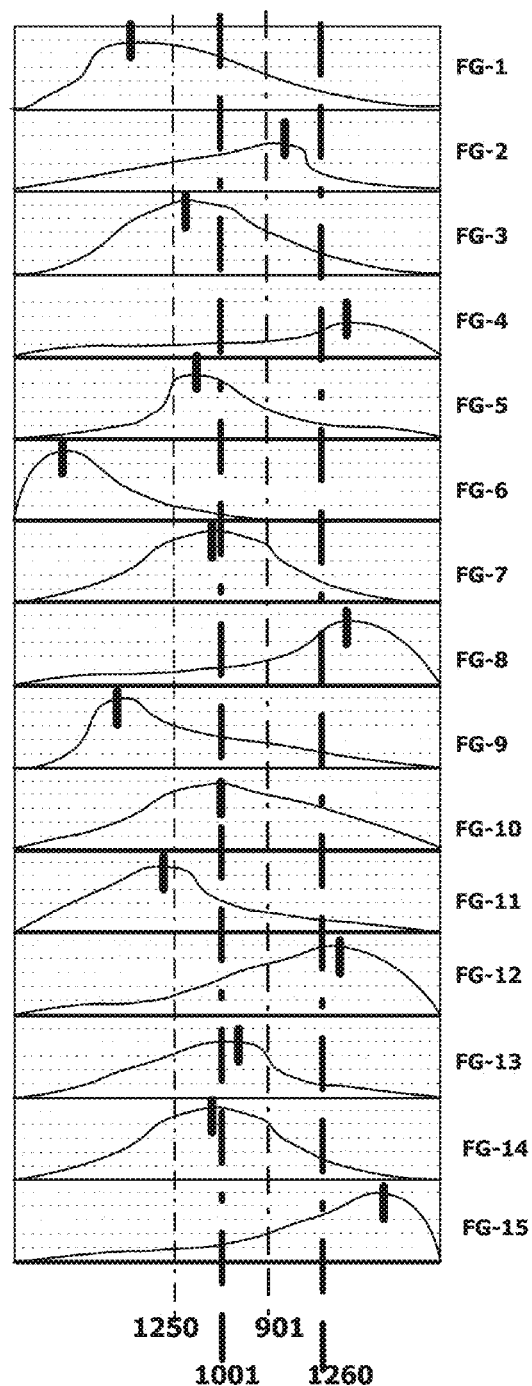
FIG. 12 shows the illustrative collection of 15 focus graphs, including a grid, where the graphs are aligned so that a vertical line through all the graphs represents a single lens position.
Figure 13:
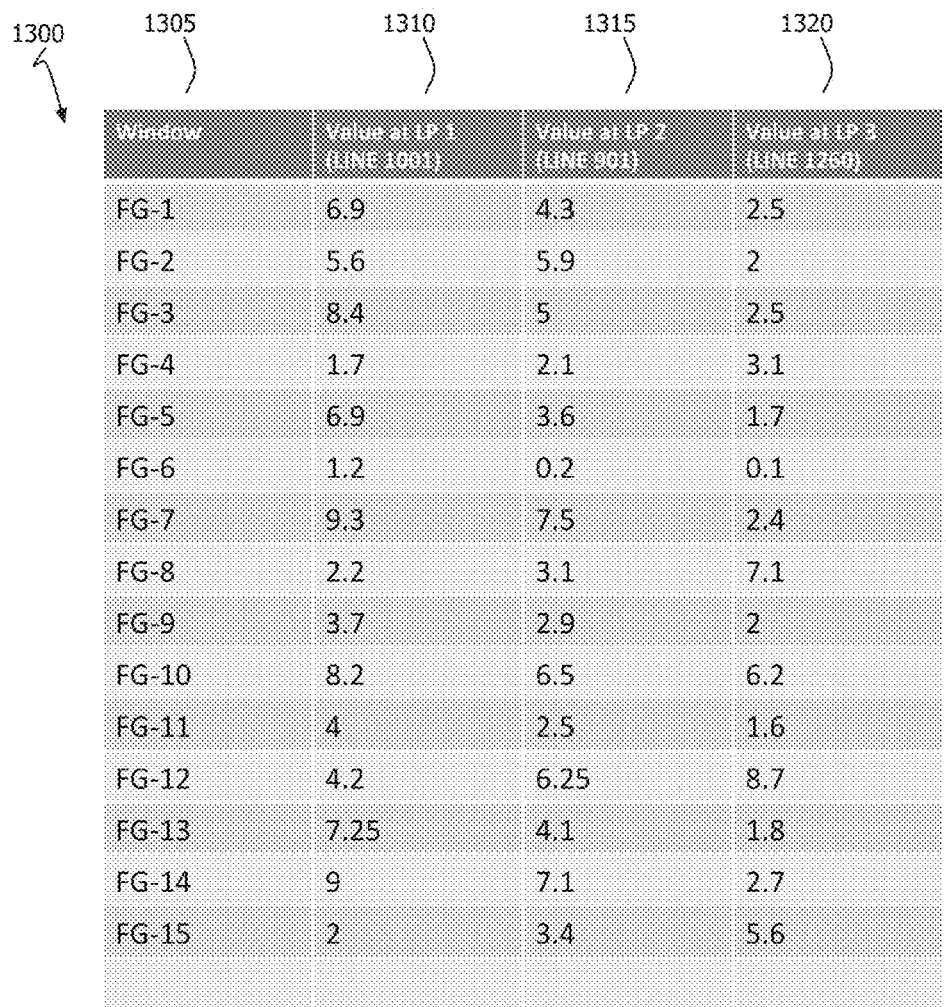
FIG. 13 illustrates a table holding focus graph data associated with embodiments and examples of embodiments.

Referring to FIG. 11, there is shown a process for determining the peak relationships (such as ⅓ macro-⅔ infinity lens positions) without a full scan of lens positions and by using as few as two lens positions. At block 1101 the lens is placed in its initial position. In one embodiment, the initial position may be a pre-defined place such as a ratio between the infinity and macro positions (e.g. at either end, mid-way, or one third from either side). In other embodiments, the initial position may be determined dynamically by evaluating camera parameters or other parameters, such as sensor parameters, from one or more computer devices that host the camera. In addition, in one or more embodiments, the initial position may simply be the position that the lens is in at the beginning of the process (i.e. no adjustment made to move to initial position. For purposes of illustration, FIG. 10 shows focus graphs for 15 focus windows and we assume (for this example) that line 1001 shows the initial lens position. The process continues at block 1110 where a first image is captured for analysis, the first image being captured with the lens in the initial position shown by line 1001. Following to block 1113, focus values are extracted from the image for each window being employed in a focus or autofocus arrangement. Referring again to FIG. 10, the focus value at the lens position represented by line 1001 may be reflected by the intersection of line 1001 with each focus graph. In some embodiments, the actual focus value is derived from an assessment of contrast in the window, but perhaps from other factors as well. For these embodiments, the focus value may be derived in any way that determines or estimates the quality of focus in each window. For purpose of this illustration, we estimate a focus value between 0 and 10 based upon based upon the vertical position of the focus graph at the lens location indicated by vertical line 1001. While in most embodiments, these values will be measured and derived as described above, for purpose of this illustration, FIG. 12 shows a version of FIG. 10 on a grid to aid in estimating the values. FIG. 13 shows a table displaying the focus values in column 1310 for each focus graph as identified in column 1305.

Referring to FIG. 11 again, control moves to block 1115, where the lens position is adjusted. For purpose of illustration, the new position of the lens is shown in FIG. 12 by line 901. While the illustrated adjustment is in the macro direction, embodiments of the invention may similarly move the lens in the infinity direction as well. Control moves to block 1120 where the (n+1)th image is captured for analysis (for this particular illustration, the second image). At block 1123, the focus values are extracted as described above. For illustration, the values from the focus graphs of FIG. 12 corresponding to line 901 are estimated and recorded in column 1315 of FIG. 13.

Peak analysis is performed at block 1125. In certain embodiments and for purposes of the illustration under discussion, peak analysis involves determining the number of windows with increasing and/or decreasing focus values and ultimately the number of focus graph peaks on each side of the lens position. For example, and referring to FIG. 13, in the window represented by focus graph 1 (FG-1) the focus value for lens position 1 (LP 1) was 6.9 and for LP 2 it was 4.3. Thus for FG-1, the focus value is decreasing. If all the focus graphs in the illustration are examined, we find that five values are increasing (FG 2, 4, 8, 12 and 15) while the remaining 10 are decreasing. Therefore, by using only two lens positions, we can determine that one third of the focus graph peaks are on the macros side of the lens position and two thirds are on the infinity side.

Figure 14:
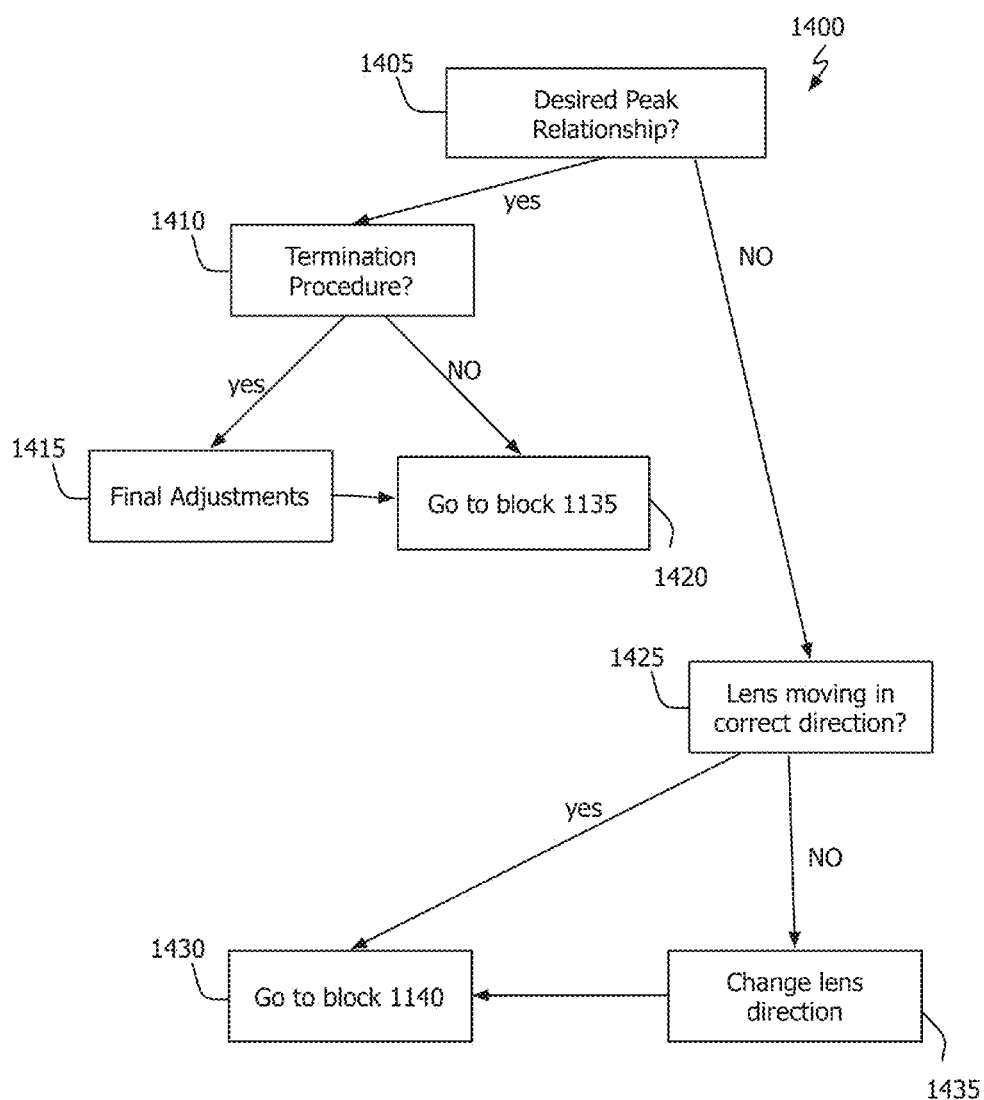
FIG. 14 shows a process associated with embodiments of the invention.

Control moves to block 1130 to determine if the process can terminate with a final lens position or whether more lens positions are necessary. An illustrative process for block 1130 with respect to some embodiments is shown in FIG. 14, which is discussed below. Generally, as discussed above, a camera or system designer may seek different peak positions or ratios of macro side and infinity side depending upon the preference of the designer or the precise application of the camera or mode of the camera. In some embodiments of the current invention, the goal position of the lens is positioned between ⅓ of the peaks on the macro side and ⅔ of the peaks on the infinity side. The exemplary illustration is in that precise situation, with 5 peaks on the macro side of position 901 and 10 peaks on the infinity side of position 901. Therefore, in some embodiments, at block 1130 a determination will be made that no further lens positions are necessary. In this case, control proceeds to block 1135 and the last position (i.e. 901) is determined to be the final position. Alternatively, at block 1130, an exemplary process (or part thereof) may be followed as shown in FIG. 14.

Referring to FIG. 14, which shows an exemplary process for block 1130 from FIG. 11, control initially rests in block 1405 where it is determined whether the current assessment of peak relationships is at the desired point. As discussed above, this determination may regard any ratio or relationship between macro side peaks and infinity side peaks, and/or rising and falling focus values. If the desired peak relationship has not been reached, then control moves to block 1425 where a determination is made if the lens is moving in the correct direction. For example, if the desired ratio of our illustration was 50% peaks on the infinity side and 50% on the macro side of the lens, then the analysis of block 1125 (from FIG. 11) would reveal that line 901 is too far to the macro side. This is because only a third of the peaks are on the macro side of lens position 901. Thus, if the 50-50 split was desired, then at block 1425 it would be determined that the direction of the lens must be reversed. Further, at block 1435 the direction can be reversed and then control can go back to block 1140 (of FIG. 11) where the lens is actually moved. In some embodiments, the movement of the lens will not repeat stops that have already been analyzed. For example, in those embodiments, the lens might move to the position indicated by line 1250 and would not stop again at step 1001.

Finally, with respect to direction changes, some embodiments may only examine the necessity of a direction change until a change has been made and thereafter forego the examination until a final focus is found.

Returning to block 1405 of FIG. 14, if the desired peak relationship has been found, control moves to block 1410 where it is determined whether a termination procedure may be followed to further adjust the lens with respect to the desired ratio. If no termination procedure is followed, then control passes back to block 1135 of FIG. 11. If a termination procedure is desired, control passes to block 1415 where final adjustments can be made. In some embodiments, final adjustments may involve continuing to move the lens in the same direction, for example, to position 1260 as shown in FIG. 12. Focus values would again be taken at the new position and a determination made whether the desired ratio had changed, i.e. in the case of our illustration whether the ⅔-⅓ relationship still existed. In one embodiment, the lens may continue to move in the same direction (repeating analysis at each stop) until the ratio is changed. In this manner, the process can find the most macro-sided position where the desired ratio is still maintained. The process may end when the desired ratio is violated. For example, at lens position 1260 (in FIG. 12), the data of FIG. 13. in column 1320 shows that only 4 focus graphs are moving higher (FG-4, 8, 12 and 15). Thus, the desired ratio has been breached. After the breach, a final lens position may be reached by any of the following: stepping back to the prior lens position; stepping back half way (or by another predetermined portion) to the prior lens position; or, iteratively moving the lens back (or back and forth) to find the position closest to the desired position.

Moving back to FIG. 11 at block 1130, if a final lens ratio has not been reached at block 1130, control passes to block 1140 where the lens position is incremented. The process then returns to block 1120 to capture the (n+1)th image and the blocks are iterated until a final position is found.

Empirically, the inventors have determined that not all windows in the focus carry equivalently important or valuable information for the purpose of determining focus. To address this reality, some embodiments of the invention use a weighting system to enhance or diminish the focus values of each window and apply the same peak ratio analysis with respect to the weighted numbers. For example, some embodiments weight the focus values according to the position of the window in the frame—windows in presumably more relevant position (e.g. the middle) being weighted more. Other embodiments of the invention weight the focus values by contrasting the relative magnitudes of focus values between windows. For example, for any particular lens position, the focus values may be ranked by their magnitudes. Still in other embodiments, both the position of the window and the magnitude of the focus value may be considered.

Referring to FIG. 11, in some embodiments a weighted analysis may be used in block 1130 in order to more accurately focus the camera by giving more consideration to more valuable/relevant focus values. Like the process described above, a determination regarding whether a final focus is found can be made at block 1130 and if no final focus is found the lens may be moved (in an appropriate direction) and the process iterated as shown in FIG. 11.

Referring to FIG. 15, a table is shown to facilitate an illustration of a weighting analysis in association with block 1130. Column 1505 lists the focus window under consideration; column 1510 shows focus values for lens position 1, which for illustration can be seen with respect to line 1001 of FIG. 12; column 1510 shows focus values for lens position 2, which for illustration can be seen with respect to line 901 of FIG. 12; and, column 1520 indicates whether the sequential focus values for lens position 1 and lens position 2 are increasing (up) or decreasing (down)("1" for increasing, "0" for decreasing). In column 1530, a rank is assigned to each value of the most recent lens position, which in the case of this illustration is lens position 2. In some embodiments such as this illustration, the focus graphs are ranked according to the magnitude of the focus value at the specified lens position. In one embodiment, the goal is to give more consideration to higher ranked focus graphs, thus the highest ranked value should be assigned the highest number. Any practical scheme can accomplish this purpose. For example, in the illustration, the highest ranked value (FG-7) has the highest rank number (15) while the lowest ranked value (FG-6) has the lowest value (1). In an alternative embodiment, the values may be ranked from 1 to n (n being 15 in the current example) and the rank number may be subtracted from the total number of focus graphs. In this arrangement, the lowest ranked focus graph will earn a zero. Any number of schemes might be derived for the ranking as long as a scheme enhances higher focus values and detracts from lower focus values. These ranking values shown in column 1525 can be added or multiplied by the actual focus value (column 1515) in order to bias the analysis toward more relevant windows.

For some embodiments, weighting may also be accomplished by considering the position of the focus window. For example, with reference to a window grid of FIG. 7B, the center window may be more valuable and the edges may be less valuable. Alternatively, image content may help define a position factor for a focus window. For example, facial recognition or other content-discoverable indicators in the frame may align with a window thereby indicating more importance at that position in a window (e.g. windows that align with faces may be considered more relevant). With respect to the illustration of FIG. 15, a position factor has been assigned based upon prioritization of the center window. With additional reference to FIG. 7B, window position 8 has been assigned the highest value of 1, while windows surrounding window 8 (2, 3, 4, 9, 14, 13, 12, and 7) were assigned a 0.6 and the edge-placed windows (1, 6, 11, 5 10, and 15) were assigned 0.2. The choice of how to weight a position can be selected by the designer as desired for the particular application. In addition, the choice to use either weighting factor to normalize or scale the values (e.g. the position factors vary between 0 and 1) is also a design choice.

In one embodiment, both the rank (column 1525) and the position (column 1530) may be used together form a combined weighting factor. Depending upon design choice, the combination of weight and position factors may be addition, multiplication or any mathematical function. Referring to the illustration in FIG. 15, the rank (1525) and position factor (1530) are multiplied to form a total weighting value shown in column 1535. The total weighting value may be combined with the focus values to form a weighted value as illustrated in column 1540. Depending upon design choice, the combination of total weight (1535) and focus value (1515) may be by addition, multiplication or any mathematical function. In the illustration, a function, which is indicated as a "1" in column 1520, is employed where weights are only used to enhance the focus value if the focus values are sequentially rising between lens positions. If the sequential focus values are rising, the weighted values 1540 are derived by the addition of the total weight (1535) with the focus value (1515). If the sequential focus values are not rising (indicated by a "0" in column 1520) then the weighted value in column 1540 simply equals the magnitude of the focus value from column 1515. Once a weighted value has been determined for each window (i.e. in column 1540), the sum of the weighted values is taken from the rising focus values. In our illustration, the weighted values representing rising focus values are shown in column 1545 and summed at the bottom of that column (41.95 in the example).

In one embodiment, the goal is to position the lens with one third of the overall weight on the macro side and two thirds of the overall weight on the infinity side. Thus the sum of the weighted up movers (representing the weight in the macro side of the lens—and 41.95 in the example) is compared to the overall sum of all the weighted values, which are totaled near the bottom of column 1540 (86.65 in the example). In order to adhere to the one-third/two-thirds ratio of the embodiment, the sum of the value of the up movers (41.95) must approximately equal one third of the total weighted values—the total being 85.65 in the example and one third the total shown at the very bottom of column 1540 as 28.55 in the example. If the sum of the weighted up movers (41.95 in the example) is less than one third of the sum of the total weights (28.55 in the example), the lens needs to be moved further in the macro direction. If the sum of the weighted up movers (41.95 in the example) is greater than one third of the sum of the total weights (28.55 in the example)—as it is in this example—, the lens needs to be moved in the infinity direction. Referring to FIG. 11, if the process moves to block 1140, the lens is moved and focus graph data for another lens position is collected. The focus graph data is the same regardless of whether or not a weighting scheme is employed. In one embodiment, the weighting schemes are employed to decide whether the lens is in a correct position or must be moved.

As discussed above with respect to FIGS. 11 and 14, during a weighting-oriented analysis, the process of moving the lens and capturing images may stop when the ratio is close to one-third/two-thirds or as the designer chooses. Process 1400 may similarly apply to a weighting-oriented analysis regarding final adjustments and moving the lens, but the weighted values are employed to make decisions regarding lens position.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A camera focus method comprising:
receiving, by a computer, a first image from a camera arrangement with a camera lens positioned in a first position, wherein the camera arrangement is integral with the computer;
extracting from the first image first focus information, where first focus information comprises a first value for each of focus windows;
storing the first focus information as associated with the first lens position;

moving the camera lens to a second position;

receiving, by the computer, a second image from the camera arrangement with the camera lens positioned in the second position;

extracting from the second image second focus information, where second focus information comprises a second value for each of the focus windows, wherein each second value corresponds to one of the first values;

storing the second focus information as associated with the second lens position;

comparing, a plurality of first values with the corresponding second values to determine a plurality of relative values, where each relative value indicates whether moving the camera lens to the second position corresponds to a first direction that approaches or a second direction that moves away from a maximum focus position for each of the focus windows;

and determining whether a number of focus windows with relative values associated with the first or second direction satisfy a pre-defined standard for determining an autofocus lens position.

2. The camera focus method of claim 1, wherein the pre-defined standard for determining the autofocus lens position indicates one or more of the following:

a minimum percentage of a total number of focus windows that have relative values indicative of the first direction that approaches the maximum focus positions;

a maximum percentage of the total number of focus windows that have relative values indicative of the first direction that approaches the maximum focus positions;

a minimum percentage of the total number of focus windows that have relative values indicative of the second direction that moves away from the maximum focus positions; and a maximum percentage of the total number of focus windows that have relative values indicative of the second direction that moves away from the maximum focus positions.

3. The camera focus method of claim 1, wherein the pre-defined standard for determining a lens position indicates that one third of the focus windows have relative values indicative of the first direction approaching the maximum focus positions.

4. The camera focus method of claim 1, further comprising:

receiving, by the computer, a third image from the camera arrangement with the camera lens positioned in a third position when the number of focus windows with relative values do not meet the pre-defined standard for determining the autofocus lens position;

and extracting from the third image third focus information, where third focus information comprises a third value for each of the focus windows.

5. The camera focus method of claim 4, further comprising:

determining a second relative value that indicates whether moving the camera lens from the second to the third position is in the direction of the first direction that approaches or the second direction that moves away from the maximum focus position for each of the focus windows;

determining a third number of focus windows with the second relative values indicative of the first direction that approaches the maximum focus position and a fourth number of focus window with the second relative values indicative of the second direction that moves away from the maximum focus position;

and determining whether the second number of focus windows with the second relative values, the third number of focus windows with the second relative values, or both satisfy the pre-defined standard for determining the autofocus lens position.

6. The camera focus method of claim 1, wherein the pre-defined standard for determining the autofocus lens position includes an indication regarding a percentage of focus windows that have relative values indicative of the first direction that approaches the maximum focus position based on an increase from the first value to the second value of each of the focus windows, wherein the method further comprises:

receiving, by the computer, a third image from the camera arrangement with the camera lens positioned in a third position when the number of focus windows with increasing values complies with the pre-defined standard for determining the autofocus lens position;

extracting from the third image third focus information, where third focus information comprises a third value for each of the focus windows;

determining a percentage or number of corresponding focus window values that are increasing from the second value to the third value;

determining whether the percentage or number of corresponding focus window values complies with a second pre-defined standard for determining the autofocus lens position; and basing the autofocus lens position on the second lens position when the percentage or number of corresponding focus window values does not correspond to the second pre-defined standard.

7. The camera focus method of claim 6, wherein the pre-defined standard is the same as the second pre-defined standard.

8. The camera focus method of claim 6, wherein the autofocus lens position is the second lens position.

9. The camera focus method of claim 6, wherein the autofocus lens position is between the second lens position and the third lens position.

10. A camera focus method comprising:

receiving, by a computer, a first image from a camera under control of the computer, the camera having a lens positioned in a first position;

extracting from the first image a first value for each of a plurality of first focus windows;

storing the first values as associated with the first lens position;

moving the lens to a second position;

receiving, by the computer, a second image from the camera with the lens positioned in the second position;

extracting from the second image a second value for each of a plurality of second focus windows, and wherein each second focus window corresponds to a first focus window, the corresponding focus windows forming a set of focus windows;

storing the second value as associated with the second lens position;

comparing the first values with the corresponding second values to make a determination for each focus window set regarding relative value of the first value with respect to the second value;

and assigning a weighting factor to each of the corresponding focus windows of the set of focus windows, the weighting factor based upon at least one of the position of the corresponding focus window and a magnitude of the second value;

combining the weighting factor with second values to form a weighted value for each set of focus windows;

summing the weighted values for the corresponding focus windows of the sets of focus windows to form a total weighted sum;

comparing the total weighted sum to either (i) the sum of the weighted values for the corresponding focus windows of the sets of focus windows where the relative values are increasing from the first value to the second value or (ii) the sum of the weighted values for all for the corresponding focus windows of the sets of focus windows where values are not increasing from the first value to the second value;

and determining whether the comparison of weighted sums corresponds to a pre-defined standard for determining a lens position.

11. The camera focus method of claim 10, wherein the pre-defined standard is that the total weighted sum is approximately three times the sum of the weighted values for the corresponding focus windows of the sets of focus windows where values are increasing from the first value to the second value.

12. The camera focus method of claim 10, wherein the pre-defined standard is that a specified percentage of the total weighted sum is either:
approximately equal to the sum of the weighted values for the corresponding focus windows of the sets of focus windows where values are increasing from the first value to the second value; or
greater than the sum of the weighted values for the corresponding focus windows of the sets of focus windows where values are increasing from the first value to the second value and less than the sum of the weighted values for the corresponding focus windows of the sets of focus windows where values are increasing from the first value to the second value.

13. The camera focus method of claim 10, further comprising:
if the comparison of the weighted sums does not comply with the pre-defined standard for determining lens position, then
moving the lens to a third position;
receiving, by the computer, a third image from the camera with the lens positioned in the third position;
extracting from the third image a third value for each of a plurality of third focus windows, and wherein each third focus window corresponds to a second focus window, the corresponding focus windows forming a second set of focus windows;
storing the third values as associated with the third lens position;
assigning a second weighting factor to each second set of focus windows, the second weighting factor based upon at least one of the position of the focus window and a magnitude of the third value;
combining the second weighting factor with third values to form a second weighted value for each second set of focus windows;
summing the second weighted values for all the second sets of focus windows to form a second total weighted sum;
comparing the second total weighted sum to either (i) the sum of the second weighted values for the corresponding focus windows of the second sets of focus windows where values are increasing from the second value to the third value; or (ii) the sum of the second weighted values for the corresponding focus windows of the sets of focus windows where values are not increasing from the second value to the third value; and
determining whether the comparison with the second total weighted sum complies to the pre-defined standard for determining a lens position.

14. The camera focus method of claim 10, further comprising:
if the comparison of the weighted sums does not comply with the pre-defined standard for determining lens position, then
determining whether to move the lens in the macro direction or the infinity direction; and
moving the lens in the direction determined.

15. The camera focus method of claim 14, wherein the act of determining whether to move the lens in the macro direction or the infinity direction comprises determining that the total weighted sum is less than approximately three times the sum of the weighted values for the corresponding focus windows of the sets of focus windows where values are increasing from the first value to the second value.

16. A system comprising:
a memory for storing instructions for a microprocessor including a camera application program and a plurality of application programs that are not associated with a camera;
a camera including a movable lens, the lens movable in a range from an infinity position to a macro position, under control of the camera application program;
the microprocessor for executing the instructions stored in the memory, certain instructions when executed cause the microprocessor to:
initiate the camera application program;
capture a first image using the camera having the movable lens positioned in a first position;
analyze the first image to determine a first value for each of a plurality of focus windows;
store the first values as associated with the first lens position;
move the movable lens to a second position;
capture a second image using the camera with the movable lens positioned in the second position;
analyze the second image to determine a second value for each of the focus windows;
store the second values as associated with the second position;
compare a plurality first values with corresponding second values to determine a plurality of relative values, wherein each of the relative values indicate whether moving the movable lens to the second position is in a first direction that approaches or a second direction that moves away from a maximum focus position for each of the focus windows; and
move the moveable lens to a third position based upon a determination of whether a number of focus windows with relative-values associated with the first or second direction satisfy a pre-defined standard for determining an autofocus lens position.

17. The system of claim 16 wherein the relative values are indicative of the first direction that approaches the maximum focus positions is based on an increase from the first value to the second value of each of the focus windows, and wherein certain instructions when executed further cause the microprocessor to:

determine the percentage or number of focus windows for which the relative values are increasing from the first value to the second value; and determine whether the number of focus windows with increasing values complies with the pre-defined standard for determining the autofocus lens position.

18. The system of claim 17 wherein the pre-defined standard for determining the autofocus lens position indicates a percentage or a total number of focus windows with relative values that have increasing values.

19. The system of claim 16, wherein the relative values are indicative of the first direction that approaches the maximum focus positions is based on an increase from the first value to the second value of each of the focus windows, and wherein certain instructions when executed further cause the microprocessor to:

assign a weighting factor to each of the focus windows, the weighting factor based upon at least one of the position of the focus window and a magnitude of the second value;

combine the weighting factor with second values to form a weighted value for each of the focus windows;

sum the weighted values for the focus windows to form a total weighted sum;

compare the total weighted sum to either (i) the sum of the weighted values for the focus windows where the relative values are increasing from the first value to the second value; or (ii) the sum of the weighted values for the focus windows where the relative values are not increasing from the first value to the second value; and determine whether the comparison with the total weighted sum complies the pre-defined standard for determining the autofocus lens position.

20. The system of claim 19, wherein moving the movable lens to a third position based upon the comparison of the first values with the corresponding second value includes moving the movable lens to a third position when the comparison of weighted sums corresponds to the pre-defined standard for determining the autofocus lens position.

* * * * *

UNITED STATES PATENT AND TRADEMARK OFFICE
CERTIFICATE OF CORRECTION

| | | |
|---|---|---|
| PATENT NO. | : 9,451,155 B2 | Page 1 of 1 |
| APPLICATION NO. | : 14/447427 | |
| DATED | : September 20, 2016 | |
| INVENTOR(S) | : Ralph Brunner et al. | |

It is certified that error appears in the above-identified patent and that said Letters Patent is hereby corrected as shown below:

In the Claims

Column 14, Line 65: delete the phrase "each of focus windows" and insert the phrase --each of a plurality of focus windows--

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*